(12) United States Patent
Hirata et al.

(10) Patent No.: US 9,365,699 B2
(45) Date of Patent: Jun. 14, 2016

(54) METHOD FOR PRODUCING RUBBER COMPOSITION

(75) Inventors: Narukuni Hirata, Tokyo (JP); Takeshi Oba, Tokyo (JP); Satoru Watanabe, Tokyo (JP)

(73) Assignee: BRIDGESTONE CORPORATION, Tokyo (JP)

( * ) Notice: Subject to any disclaimer, the term of this patent is extended or adjusted under 35 U.S.C. 154(b) by 19 days.

(21) Appl. No.: 14/114,247

(22) PCT Filed: Apr. 24, 2012

(86) PCT No.: PCT/JP2012/060979
§ 371 (c)(1),
(2), (4) Date: Jan. 2, 2014

(87) PCT Pub. No.: WO2012/147746
PCT Pub. Date: Nov. 1, 2012

(65) Prior Publication Data
US 2014/0107285 A1    Apr. 17, 2014

(30) Foreign Application Priority Data
Apr. 28, 2011 (JP) .................. 2011-102366

(51) Int. Cl.
| C08K 5/39 | (2006.01) |
| C08K 5/44 | (2006.01) |
| C08K 5/47 | (2006.01) |
| C08K 3/36 | (2006.01) |
| C08K 3/04 | (2006.01) |
| C08K 5/548 | (2006.01) |
| C08K 5/31 | (2006.01) |
| C08K 5/40 | (2006.01) |
| C08K 5/405 | (2006.01) |
| C08J 3/20 | (2006.01) |
| B60C 1/00 | (2006.01) |
| C08K 5/5415 | (2006.01) |
| C08K 5/00 | (2006.01) |

(52) U.S. Cl.
CPC .............. *C08K 5/548* (2013.01); *B60C 1/0016* (2013.04); *C08J 3/20* (2013.01); *C08K 3/04* (2013.01); *C08K 3/36* (2013.01); *C08K 5/31* (2013.01); *C08K 5/39* (2013.01); *C08K 5/40* (2013.01); *C08K 5/405* (2013.01); *C08K 5/44* (2013.01); *C08K 5/47* (2013.01); *C08K 5/5415* (2013.01); *C08J 2307/00* (2013.01); *C08K 5/0025* (2013.01)

(58) Field of Classification Search
CPC .............. C08K 5/548; C08K 5/44; C08K 5/47; C08K 3/04; C08K 5/39; C08K 3/36; C08K 5/31; C08K 5/40; C08K 5/405
USPC .................................................. 524/575, 198
See application file for complete search history.

(56) References Cited

U.S. PATENT DOCUMENTS

| 2010/0105805 A1 | 4/2010 | Sasaka |
| 2010/0108239 A1 | 5/2010 | Recker et al. |
| 2010/0317758 A1 * | 12/2010 | Okuda et al. ................. 521/140 |

FOREIGN PATENT DOCUMENTS

| EP | 0940435 | * | 3/1999 |
| EP | 2 623 546 A1 | | 8/2013 |
| EP | 2 623 547 A1 | | 8/2013 |
| EP | 2 623 551 A1 | | 8/2013 |
| EP | 2 623 552 A1 | | 8/2013 |
| EP | 2 623 553 A1 | | 8/2013 |
| EP | 2 695 911 A1 | | 2/2014 |
| JP | 7-165991 A | | 6/1995 |
| JP | 11-286577 A | | 10/1999 |
| JP | 2002-521515 A | | 7/2002 |
| JP | 2002-521516 A | | 7/2002 |
| JP | 2003-523472 A | | 8/2003 |
| JP | 2003-530443 A | | 10/2003 |
| JP | 2011-26414 A | | 2/2011 |
| WO | 2008/123306 A1 | | 10/2008 |
| WO | WO2009/068643 | * | 6/2009 |

OTHER PUBLICATIONS

Communication from the European Patent Office issued Dec. 8, 2014 in a counterpart European Application No. 12776874.5.

* cited by examiner

*Primary Examiner* — Rabon Sergent
*Assistant Examiner* — Deve E Valdez
(74) *Attorney, Agent, or Firm* — Sughrue Mion, PLLC

(57) ABSTRACT

The invention is a process for producing a rubber composition containing at least one rubber component (A) selected from natural rubbers and synthetic diene rubbers, a filler containing an inorganic filler (B), a silane coupling agent (C) and a vulcanization accelerator (D), wherein the rubber composition is kneaded in multiple stages, the rubber component (A), all or a portion of the inorganic filler (B), all or a portion of the silane coupling agent (C) and the vulcanization accelerator (D) are added and kneaded in the first stage of kneading, and the specific energy for kneading in the first stage is from 0.05 to 1.50 kWh/kg. The specific energy is obtained by dividing the power consumption by the motor in the kneading device in the first stage of kneading by the total mass of the rubber composition therein.

19 Claims, No Drawings

METHOD FOR PRODUCING RUBBER COMPOSITION

CROSS REFERENCE TO RELATED APPLICATIONS

This application is a National Stage of International Application No. PCT/JP2012/060979, filed on Apr. 24, 2012, which claims priority from Japanese Patent Application No. 2011-102366, filed on Apr. 28, 2011, the contents of all of which are incorporated herein by reference in their entirety.

TECHNICAL FIELD

The present invention relates to a process for producing a rubber composition containing an inorganic filler and having an improved low-heat-generation property.

BACKGROUND ART

Recently, in association with the movement of global regulation of carbon dioxide emission associated with the increase in attraction to environmental concerns, the demand for low fuel consumption by automobiles is increasing. To satisfy the requirement, it is desired to reduce rolling resistance relating to tire performance. Heretofore, as a means for reducing the rolling resistance of tires, a method of optimizing tire structures has been investigated; however, at present, a technique of using a low-heat-generating rubber composition for tires has become employed as the most common method.

For obtaining such a low-heat-generating rubber composition, there is known a method of using an inorganic filler such as silica or the like.

However, in incorporating an inorganic filler such as silica or the like in a rubber composition to prepare an inorganic filler-containing rubber composition, the inorganic filler, especially silica aggregates in the rubber composition (owing to the hydroxyl group in the surface of silica), and therefore, for preventing the aggregation, a silane coupling agent is used.

Accordingly, for successfully solving the above-mentioned problem by incorporation of a silane coupling agent, various trials have been made for increasing the activity of the coupling function of the silane coupling agent.

For example, Patent Reference 1 proposes a rubber composition containing, as basic components, at least (i) one diene elastomer, (ii) a white filler as a reinforcing filler and (iii) an alkoxysilane polysulfide as a coupling agent (white filler/diene elastomer) along with (iv) an enamine and (v) a guanidine derivative.

Patent Reference 2 discloses a rubber composition containing, as basic components, at least (i) one diene elastomer, (ii) a white filler as a reinforcing filler and (iii) an alkoxysilane polysulfide as a coupling agent (white filler/diene elastomer) along with (iv) zinc thiophosphate and (v) a guanidine derivative.

Patent Reference 3 describes a rubber composition containing, as basic components, at least (i) a diene elastomer, (ii) an inorganic filler as a reinforcing filler and (iii) an alkoxysilane polysulfide (PSAS) as an (inorganic filler/diene elastomer) coupling agent, as combined with (iv) an aldimine (R—CH=N—R) and (v) a guanidine derivative.

Further, Patent Reference 4 proposes a rubber composition basically containing at least (i) a diene elastomer, (ii) an inorganic filer as a reinforcing filer and (iii) an alkoxysilane polysulfide as a coupling agent, as combined with (iv) 1,2-dihydropyridine and (v) a guanidine derivative.

However, in these inventions, nothing is taken into consideration relating to kneading conditions.

Furthermore, although Patent Reference 5 may be cited as an example of improving the coupling function activity of the silane coupling agent with kneading conditions in consideration, but it is not taken into account to restrict the reduction with respect to the effect of improving the coupling function activity due to the silane coupling agent, which is caused by the other compounding agents.

CITATION LIST

Patent References

[Patent Reference 1] JP-T-2002-521515
[Patent Reference 2] JP-T-2002-521516
[Patent Reference 3] JP-T-2003-530443
[Patent Reference 4] JP-T-2003-523472
[Patent Reference 5] WO2008/123306

SUMMARY OF THE INVENTION

Problems that the Invention is to Solve

Under such circumstances, an object of the present invention is to provide a process for producing a rubber composition capable of being made to favorably have a low-heat-generation property and have good abrasion resistance by further improving the coupling function activity thereof.

Solution to Problem

In order to accomplish the above object, the present inventors made various experiments by blending a rubber component, all or a portion of an inorganic filler, all or a portion of a silane coupling agent and at least one vulcanization accelerator selected from guanidines, sulfenamides, thiazoles, thiurams, dithiocarbamates, thioureas and xanthates, in the first stage of the kneading step. As a result, the inventors found that, even where the vulcanization accelerator was incorporated, the coupling function activity could be effectively improved in some cases but could not in the other cases. With that, the inventors further made various analytical experiments for ascertaining the factor of enhancing the effect and, as a result, have found that, in order to improve the coupling function activity, the specific energy for kneading in the first stage of the kneading step is to be defined to fall within a specific range. This finding led to completion of the present invention.

That is, the present invention is a process for producing a rubber composition containing at least one rubber component (A) selected from natural rubbers and synthetic diene rubbers, a filler containing an inorganic filler (B), a silane coupling agent (C) and a vulcanization accelerator (D), wherein the rubber composition is kneaded in multiple stages, the rubber component (A), all or a portion of the inorganic filler (B), all or a portion of the silane coupling agent (C) and the vulcanization accelerator (D) are added and kneaded in the first stage of kneading, and the specific energy for kneading in the first stage is from 0.05 to 1.50 kWh/kg.

The specific energy is obtained by dividing the power consumption by the motor in the kneading device in the first stage of kneading by the total mass of the rubber composition therein.

Advantageous Effects of Invention

According to the present invention, there can be provided a process for producing a rubber composition capable of being made to favorably have a low-heat-generation property and have good abrasion resistance by further improving the coupling function activity of the silane coupling agent therein.

DESCRIPTION OF EMBODIMENTS

The invention is described in detail herein under.

The process for producing a rubber composition of the first aspect of the present invention is a process for producing a rubber composition containing at least one rubber component (A) selected from natural rubbers and synthetic diene rubbers, a filler containing an inorganic filler (B), a silane coupling agent (C) and a vulcanization accelerator (D), wherein the rubber composition is kneaded in multiple stages, the rubber component (A), all or a portion of the inorganic filler (B), all or a portion of the silane coupling agent (C) and the vulcanization accelerator (D) are added and kneaded in the first stage of kneading, and the specific energy for kneading in the first stage is from 0.05 to 1.50 kWh/kg.

Here, the specific energy is a value of the work done in the first stage of kneading, as expressed per the unit rubber composition mass relative to the total mass of the rubber composition that is the total amount of the starting materials added in the first stage of kneading. The specific energy is obtained by dividing the power consumption by the motor in the kneading device in the first stage of kneading by the total mass of the rubber composition therein.

In the present invention, the vulcanization accelerator (D) is added and kneaded in the first stage of kneading, and this is for the purpose of improving the coupling function activity of the silane coupling agent (C) therein.

The specific energy for kneading in the first stage must be at least 0.05 kWh/kg, and this is because, when less than 0.05 kWh/kg, the filler could not be fully dispersed in rubber, and if so, the energy loss (tan δ) may increase and the abrasion of the rubber composition may increase. On the other hand, the specific energy must be at most 1.50 kWh/kg, and this is because, when more than 1.50 kWh/kg, the rubber would be deteriorated and would be much abraded. From these viewpoints, the preferred range of the specific energy is from 0.07 to 1.00 kWh/kg.

For more favorably improving the coupling function activity of the silane coupling agent (C), preferably, the blade rotation speed of the kneading device in the first stage of kneading is from 25 to 100 rpm. The blade of the kneading device may also be referred to as the rotary blade of the rotor in the kneading device.

Not specifically defined, the kneading device in the present invention is preferably a roll, a single-screw or double-screw kneader, an internal mixer or a pressure kneader, more preferably an internal mixer.

Typical examples of the internal mixer include US Farrell's Banbury mixer (tangent type), and UK Frances Shaw's Intermix (gear type).

In both the internal mixer and the pressure kneader, the rotor is provided with a blade (rotary blade), and the blade (rotary blade) kneads the rubber composition therein.

When the blade rotation speed is at least 25 rpm, then it is favorable since the filler could be well dispersed; and when at most 100 rpm, then it is also favorable since rubber degradation can be more favorably prevented.

More preferably, the rotation speed is from 30 to 90 rpm.

In order to more favorably improve the coupling function activity of the silane coupling agent (C), preferably, the kneading time in the first stage of kneading is from 30 seconds to 30 minutes.

When the kneading time is at least 30 seconds, then it is favorable since the filler could be well dispersed; and when at most 30 minutes, then it is also favorable since rubber degradation can be more favorably prevented. More preferably, the kneading time is from 1 to 20 minutes.

In order to more favorably improve the coupling function activity of the silane coupling agent (C), preferably, the maximum temperature of the rubber composition in the first stage of kneading is from 120 to 190° C., more preferably from 130 to 180° C., even more preferably from 140 to 175° C.

In the first stage in the first aspect of the present invention, it is desirable that after the rubber component (A), all or a portion of the inorganic filler (B) and all or a portion of the silane coupling agent (C) are kneaded, the vulcanization accelerator (D) is added thereto on the way of the first stage and is further kneaded.

In this case, it is desirable that the time after the addition of the rubber component (A), all or a portion of the inorganic filler (B) and all or a portion of the silane coupling agent (C) in the first stage of kneading and until the addition of the vulcanization accelerator (D) on the way of the first kneading is from 10 to 180 seconds. The lower limit of the time is more preferably 30 seconds or more, and the upper limit thereof is more preferably 150 seconds or less, even more preferably 120 seconds or less. When the time is at least 10 seconds, then the reaction between (B) and (C) could be promoted sufficiently. Even though the time is more than 180 seconds, any addition effect could hardly be obtained since the reaction between (B) and (C) has been already promoted sufficiently; and therefore, the upper limit is preferably 180 seconds. However, even when the time is 0 second, or that is, even when (C) and (D) are put into the device all at a time, the case could also enjoy the effect of the present invention. More effectively, the surface of the silane coupling agent is previously treated with fillers such as silica or the like.

The kneading step for the rubber composition in the present invention includes two stages of the first stage of kneading the components not containing any other vulcanizing agent and others except the vulcanization accelerator (D), and the last stage of kneading the component containing a vulcanizing agent and others, and optionally may further include an intermediate stage of kneading the components not containing any other vulcanizing agent and others except the vulcanization accelerator (D). Here, the wording, vulcanizing agent and others is meant to indicate a vulcanizing agent and a vulcanization accelerator.

In general, the maximum temperature in the last stage is from 80 to 120° C. or so, and the kneading time therein is from 50 to 120 seconds or so.

The first stage of kneading in the present invention means the first stage of kneading the rubber component (A), the inorganic filler (B) and the silane coupling agent (C), and does not include the stage of a case of kneading the rubber component (A) and the inorganic filler (B) in the first stage and the stage of a case of pre-kneading the rubber component (A).

The second aspect of the present invention is a process for producing a rubber composition containing at least one rubber component (A) selected from natural rubbers and synthetic diene rubbers, a filler containing an inorganic filler (B), a silane coupling agent (C) and at least one vulcanization accelerator (D) selected from guanidines, sulfenamides, thiazoles, thiurams, dithiocarbamates, thioureas and xanthates, wherein the rubber composition is kneaded in three or more multiple stages, the rubber component (A), all or a portion of the inorganic filler (B), and all or a portion of the silane coupling agent (C) are kneaded in the first stage of kneading with a specific energy for kneading falling within a range of from 0.05 to 1.50 kWh/kg, the vulcanization accelerator (D) is added and kneaded in the stage after the second stage of kneading but before the last stage thereof, and a vulcanizing agent is added and kneaded in the last stage of kneading. Like in the first aspect of the present invention, the preferred range of the specific energy is from 0.07 to 1.00 kWh/kg.

In the second aspect of the present invention, the vulcanization accelerator (D) is added and kneaded in the stage after the second stage of kneading but before the last stage thereof, and this is for the purpose of increasing the coupling function activity of the silane coupling agent (C).

The reason why the specific energy for kneading in the first stage of kneading must fall within a range of from 0.05 to 1.50 kWh/kg, the reason why the blade rotation speed in the kneading device is preferably from 25 to 100 rpm, more preferably from 30 to 90 rpm, the reason why the kneading time in the first stage of kneading is preferably from 30 seconds to 30 minutes, more preferably from 1 to 20 minutes, and the reason why the maximum temperature of the rubber composition in the first stage of kneading is preferably from 120 to 190° C., more preferably from 130 to 180° C., even more preferably from 140 to 175° C. are the same as those in the first aspect of the present invention.

The contents common to the first aspect and the second aspect of the present invention are described in detail herein under.

[Silane Coupling Agent (C)]

The silane coupling agent (C) used in the process for producing a rubber composition of the present invention is preferably one or more compounds selected from the group consisting of the compounds represented by the following general formulae (I) to (IV).

Using the silane coupling agent (C) of the type, the rubber composition in the present invention is excellent in workability thereof and can give pneumatic tires having good abrasion resistance.

General formulae (I) and (IV) are sequentially described below.

[Chem. 1]

$$(R^1O)_{3-p}(R^2)_p Si-R^3-S_a-R^3-Si(OR^1)_{3-r}(R^2)_r \qquad (I)$$

In the formula, $R^1$'s may be the same or different and are each a hydrogen atom, a linear, cyclic or branched alkyl group having 1 to 8 carbon atoms, or a linear or branched alkoxyalkyl group having 2 to 8 carbon atoms; $R^2$'s may be the same or different and are each a linear, cyclic or branched alkyl group having 1 to 8 carbon atoms; $R^3$'s may be the same or different and are each a linear or branched alkylene group having 1 to 8 carbon atoms; a is 2 to 6 as an average value; and p and r may be the same or different and are each 0 to 3 as an average value, provided that p and r are not 3 at the same time.

Specific examples of the silane coupling agent (C) represented by the above-mentioned general formula (I) include bis(3-triethoxysilylpropyl)tetrasulfide, bis(3-trimethoxysilylpropyl)tetrasulfide, bis(3-methyldimethoxysilylpropyl)tetrasulfide, bis(2-triethoxysilylethyl)tetrasulfide, bis(3-triethoxysilylpropyl)disulfide, bis(3-trimethoxysilylpropyl)disulfide, bis(3-methyldimethoxysilylpropyl)disulfide, bis(2-triethoxysilylethyl)disulfide, bis(3-triethoxysilylpropyl)trisulfide, bis(3-trimethoxysilylpropyl)trisulfide, bis(3-methyldimethoxysilylpropyl)trisulfide, bis(2-triethoxysilylethyl)trisulfide, bis(3-monoethoxydimethylsilylpropyl)tetrasulfide, bis(3-monoethoxydimethylsilylpropyl)trisulfide, bis(3-monoethoxydimethylsilylpropyl)disulfide, bis(3-monomethoxydimethylsilylpropyl)tetrasulfide, bis(3-monomethoxydimethylsilylpropyl)trisulfide, bis(3-monomethoxydimethylsilylpropyl)disulfide, bis(2-monoethoxydimethylsilylethyl)tetrasulfide, bis(2-monoethoxydimethylsilylethyl)trisulfide, bis(2-monoethoxydimethylsilylethyl)disulfide.

[Chem. 2]

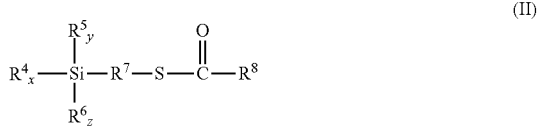

In the formula, $R^4$ is a monovalent group selected from —Cl, —Br, $R^9O$—, $R^9(C=O)O$—, $R^9R^{10}C=NO$—, $R^9R^{10}CNO$—, $R^9R^{10}N$— and —$(OSiR^9R^{10})_h$ $(OSiR^9R^{10}R^{11})$ ($R^9, R^{10}$ and $R^{11}$ may be the same or different and are each a hydrogen atom or a monovalent hydrocarbon group having 1 to 18 carbon atoms, h is 1 to 4 as an average value); $R^5$ represents $R^4$, a hydrogen atom, or a monovalent hydrocarbon group having 1 to 18 carbon atoms; $R^6$ represents $R^4, R^5$, a hydrogen atom, or an —$[O(R^{12}O)_j]_{0.5}$—group ($R^{12}$ is an alkylene group having 1 to 18 carbon atoms and j is an integer of 1 to 4); $R^7$ represents a divalent hydrocarbon group having 1 to 18 carbon atoms; $R^8$ represents a monovalent hydrocarbon group having 1 to 18 carbon atoms; and x, y and z are numbers which satisfy the relationships: $x+y+2z=3$, $0 \le x \le 3$, $0 \le y \le 2$, and $0 \le z \le 1$.

In the above general formula (II), $R^8, R^9, R^{10}$, and $R^{11}$ may be the same or different and are each preferably a group selected from the group consisting of a linear, cyclic, or a branched alkyl group, an alkenyl group, an aryl group, and an aralkyl group, each having 1 to 18 carbon atoms. In addition, when $R^5$ is a monovalent hydrocarbon group having 1 to 18 carbon atoms, it is preferably a group selected from a linear, cyclic, or branched alkyl group, an alkenyl group, an aryl group, and an aralkyl group; $R^{12}$ is preferably a linear, cyclic, or branched alkylene group, especially a linear one; $R^7$ includes, for example, an alkylene group having 1 to 18 carbon atoms, an alkenylene group having 2 to 18 carbon atoms, a cycloalkylene group having 5 to 18 carbon atoms, a cycloalkylalkylene group having 6 to 18 carbon atoms, an arylene group having 6 to 18 carbon atoms, and an aralkylene group having 7 to 18 carbon atoms. The alkylene group and the alkenylene group may be either linear or branched; and the cycloalkylene group, the cycloalkylalkylene group, the arylene group, and the aralkylene group may have a substituent such as a lower alkyl group and the like on the ring. As this $R^7$, preferable is an alkylene group having 1 to 6 carbon atoms and there may especially preferably be mentioned a linear alkylene group, for example, a methylene group, an ethylene group, a trimethylene group, a tetramethylene group, a pentamethylene group, and a hexamethylene group.

In the above general formula (II), specific examples of the monovalent hydrocarbon groups having 1 to 18 carbon atoms of $R^5, R^8, R^9, R^{10}$, and $R^{11}$ include a methyl group, an ethyl group, an n-propyl group, an isopropyl group, an n-butyl group, an isobutyl group, a sec-butyl group, a tert-butyl group, a pentyl group, a hexyl group, an octyl group, a decyl group, a dodecyl group, a cyclopentyl group, a cyclohexyl group, a vinyl group, a propenyl group, an allyl group, a hexenyl group, an octenyl group, a cyclopentenyl group, a cyclohexenyl group, a phenyl group, a tolyl group, a xylyl group, a naphthyl group, a benzyl group, a phenethyl group, a naphthylmethyl group, and the like.

In the general formula (II), examples of $R^{12}$ include a methylene group, an ethylene group, a trimethylene group, a tetramethylene group, a pentamethylene group, a hexamethylene group, an octamethylene group, a decamethylene group, a dodecamethylene group, and the like.

Specific examples of the silane coupling agent represented by the general formula (II) include 3-hexanoylthiopropyltriethoxysilane, 3-octanoylthiopropyltriethoxysilane, 3-decanoylthiopropyltriethoxysilane, 3-lauroylthiopropyltriethoxysilane, 2-hexanoylthioethyltriethoxysilane, 2-octanoylthioethyltriethoxysilane, 2-decanoylthioethyltriethoxysilane, 2-lauroylthioethyltriethoxysilane, 3-hexanoylthiopropyltrimethoxysilane, 3-octanoylthiopropyltrimethoxysilane, 3-decanoylthiopropyltrimethoxysilane, 3-lauroylthiopropyltrimethoxysilane, 2-hexanoylthioethyltrimethoxysilane, 2-octanoylthioethyltrimethoxysilane, 2-decanoylthioethyltrimethoxysilane, 2-lauroylthioethyltrimethoxysilane, and the like. Among these, 3-octanoylthiopropyltriethoxysilane [trade name "NXT Silane" (registered trademark) produced by General Electric Silicones] is especially preferable.

[Chem. 3]

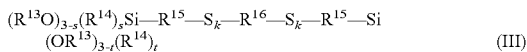

$(R^{13}O)_{3-s}(R^{14})_s Si\text{—}R^{15}\text{—}S_k\text{—}R^{16}\text{—}S_k\text{—}R^{15}\text{—}Si(OR^{13})_{3-t}(R^{14})_t$ (III)

In the formula, $R^{13}$'s may be the same or different and are each a hydrogen atom, a linear, cyclic or branched alkyl group having 1 to 8 carbon atoms, or a linear or branched alkoxyalkyl group having 2 to 8 carbon atoms; $R^{14}$'s may be the same or different and are each a linear, cyclic or branched alkyl group having 1 to 8 carbon atoms; $R^{15}$'s may be the same or different and are each a linear or branched alkylene group having 1 to 8 carbon atoms; $R^{16}$ is a divalent group of any of general formulae, (—S—$R^{17}$—S—), (—$R^{18}$—$S_{m1}$—$R^{19}$—) and (—$R^{20}$—$S_{m2}$—$R^{21}$—$S_{m3}$—$R^{22}$—) ($R^{17}$ to $R^{22}$ are each a divalent hydrocarbon group, a divalent aromatic group, or a divalent organic group containing a heteroatom other than sulfur or oxygen, each having 1 to 20 carbon atoms; and m1, m2 and m3 are each 1 or more but less than 4 as an average value); k's may be the same or different and are each 1 to 6 as an average value; s and t are each 0 to 3 as an average value, provided that s and t are not 3 at the same time.

Preferred examples of the silane coupling agent (C) represented by the above-mentioned general formula (III) are compounds represented by an average compositional formula $(CH_3CH_2O)_3Si\text{—}(CH_2)_3\text{—}S_2\text{—}(CH_2)_6\text{—}S_2\text{—}(CH_2)_3\text{—}Si(OCH_2CH_3)_3$, an average compositional formula $(CH_3CH_2O)_3Si\text{—}(CH_2)_3\text{—}S_2\text{—}(CH_2)_{10}\text{—}S_2\text{—}(CH_2)_3\text{—}Si(OCH_2CH_3)_3$, an average compositional formula $(CH_3CH_2O)_3Si\text{—}(CH_2)_3\text{—}S_3\text{—}(CH_2)_6\text{—}S_3\text{—}(CH_2)_3\text{—}Si(OCH_2CH_3)_3$, an average compositional formula $(CH_3CH_2O)_3Si\text{—}(CH_2)_3\text{—}S_4\text{—}(CH_2)_6\text{—}S_4\text{—}(CH_2)_3\text{—}Si(OCH_2CH_3)_3$, an average compositional formula $(CH_3CH_2O)_3Si\text{—}(CH_2)_3\text{—}S\text{—}(CH_2)_6\text{—}S_2\text{—}(CH_2)_6\text{—}S\text{—}(CH_2)_3\text{—}Si(OCH_2CH_3)_3$, an average compositional formula $(CH_3CH_2O)_3Si\text{—}(CH_2)_3\text{—}S\text{—}(CH_2)_6\text{—}S_{2.5}\text{—}(CH_2)_6\text{—}S\text{—}(CH_2)_3\text{—}Si(OCH_2CH_3)_3$, an average compositional formula $(CH_3CH_2O)_3Si\text{—}(CH_2)_3\text{—}S\text{—}(CH_2)_6\text{—}S_3\text{—}(CH_2)_6\text{—}S\text{—}(CH_2)_3\text{—}Si(OCH_2CH_3)_3$, an average compositional formula $(CH_3CH_2O)_3Si\text{—}(CH_2)_3\text{—}S\text{—}(CH_2)_6\text{—}S_4\text{—}(CH_2)_6\text{—}S\text{—}(CH_2)_3\text{—}Si(OCH_2CH_3)_3$, an average compositional formula $(CH_3CH_2O)_3Si\text{—}(CH_2)_3\text{—}S\text{—}(CH_2)_{10}\text{—}S_2\text{—}(CH_2)_{10}\text{—}S\text{—}(CH_2)_3\text{—}Si(OCH_2CH_3)_3$, an average compositional formula $(CH_3CH_2O)_3Si\text{—}(CH_2)_3\text{—}S_4\text{—}(CH_2)_6\text{—}S_4\text{—}(CH_2)_6\text{—}S_4\text{—}(CH_2)_3\text{—}Si(OCH_2CH_3)_3$, an average compositional formula $(CH_3CH_2O)_3Si\text{—}(CH_2)_3\text{—}S_2\text{—}(CH_2)_6\text{—}S_2\text{—}(CH_2)_6\text{—}S_2\text{—}(CH_2)_3\text{—}Si(OCH_2CH_3)_3$, an average compositional formula $(CH_3CH_2O)_3Si\text{—}(CH_2)_3\text{—}S\text{—}(CH_2)_6\text{—}S_2\text{—}(CH_2)_6\text{—}S\text{—}(CH_2)_3\text{—}Si(OCH_2CH_3)_3$,

[Chem. 4]

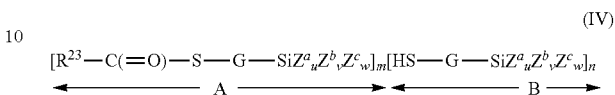

$[R^{23}\text{—}C(\!\!=\!\!O)\text{—}S\text{—}G\text{—}SiZ^a_u Z^b_v Z^c_w]_m[HS\text{—}G\text{—}SiZ^a_u Z^b_v Z^c_w]_n$ (IV)
⟵ A ⟶ ⟵ B ⟶

In the formula, $R^{23}$ is a linear, branched or cyclic alkyl group having 1 to 20 carbon atoms; G's may be the same or different and are each an alkanediyl group or an alkenediyl group, having 1 to 9 carbon atoms; $Z^a$'s may be the same or different and are each a group which can bond to two silicon atoms and is selected from [—O—]$_{0.5}$, [—O-G-]$_{0.5}$, or [—O-G-O]$_{0.5}$; $Z^b$'s may be the same or different and are each a group which can bond to two silicon atoms and is a functional group represented by [—O-G-O]$_{0.5}$; $Z^c$'s may be the same or different and are each a functional group represented by —Cl, —Br, —$OR^e$, $R^eC(\!\!=\!\!O)O$—, $R^e R^f C\!\!=\!\!NO$—, $R^e R^f N$—, $R^e$—, HO-G-O— (G is the same as the above description); $R^e$ and $R^f$ are each a linear, branched or cyclic alkyl group having 1 to 20 carbon atoms; and m, n, u, v and w are $1 \leq m \leq 20$, $0 \leq n \leq 20$, $0 \leq u \leq 3$, $0 \leq v \leq 2$, $0 \leq w \leq 1$, and (u/2)+v+2w=2 or 3; when the formula has multiple A portions, $Z^a_u$'s, $Z^b_v$'s and $Z^c_w$'s in the multiple A portions may each be the same or different; and when the formula has multiple B portions, $Z^a_u$'s, $Z^b_v$'s, and $Z^c_w$'s in the multiple B portions may each be the same or different.

Specific examples of the silane coupling agent (C) represented by the general formula (IV) include those represented by chemical formula (V), chemical formula (VI), and chemical formula (VII).

[Chem. 5]

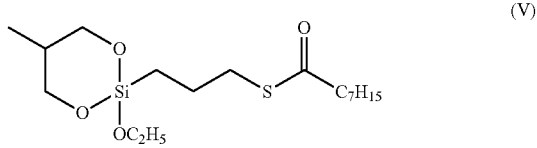

(V)

[Chem. 6]

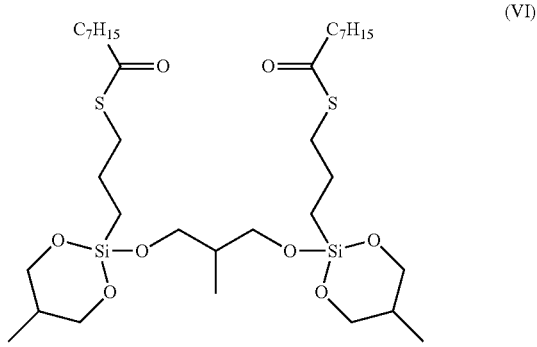

(VI)

[Chem. 7]

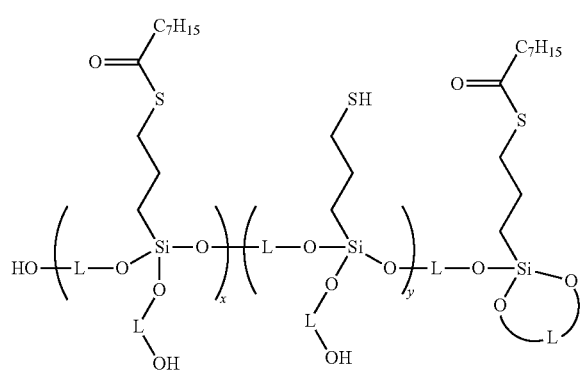

(VII)

In the formula, L's are each independently an alkanediyl group or an alkenediyl group having 1 to 9 carbon atoms; x=m; and y=n.

As a silane coupling agent represented by the chemical formula (V), there can be obtained commercially "NXT Low-V Silane" (trademark) produced by Momentive Performance Materials, Inc.

Furthermore, as a silane coupling agent represented by the chemical formula (VI), there can similarly be obtained commercially "NXT Ultra Low-V Silane" (trademark) produced by Momentive Performance Materials, Inc.

Further, as a silane coupling agent represented by the chemical formula (VII), there can be mentioned "NXT-Z" (trademark) produced by Momentive Performance Materials, Inc.

Because the above silane coupling agents represented by the general formula (II), the chemical formula (V), and the chemical formula (VI) possess protected mercapto groups, occurrence of initial vulcanization (scorch) during fabrication in processes before vulcanization can be prevented, resulting in good workability.

Furthermore, because, in the silane coupling agents represented by the chemical formulae (V), (VI), and (VII), the alkoxy silane groups have many carbon atoms, there is little generation of volatile organic compounds, VOC (especially alcohols), which is preferable in terms of work environments. Also, the coupling agent represented by the chemical formula (VII) is more preferable because it enables a low heat-generating property to be obtained as tire performance.

The silane coupling agent (C) involved in the present invention is especially preferably a compound represented by the general formula (I) among the compounds represented by the above general formulae (I) to (IV). This is so because the vulcanization accelerator (D) easily activates the polysulfide bond portion which reacts with the rubber component (A).

In the present invention, the silane coupling agent (C) may be used singly or in a combination of two or more.

The amount of the silane coupling agent (C) blended in the rubber composition of the present invention is preferably 1 to 20 mass % relative to the inorganic filler. This is so because, when the amount is less than 1 mass %, the effect of improving the low heat-generating property of the rubber composition becomes difficult to be displayed and, when the amount exceeds 20 mass %, the cost of the rubber composition becomes excessive and economic efficiency deteriorates. Furthermore, the amount is more preferably 3 to 20 mass % relative to the inorganic filler and especially preferably 4 to 10 mass % relative to the inorganic filler.

[Vulcanization Accelerator (D)]

Preferred examples of the vulcanization accelerator (D) which can be used in the process for producing a rubber composition of the present invention include at least one of guanidines, sulfenamides, thiazoles, thiurams, dithiocarbamates, thioureas and xanthates.

The guanidines used in the process for producing a rubber composition of the present invention include 1,3-diphenylguanidine, 1,3-di-o-tolylguanidine, 1-o-tolylbiguanide, di-o-tolylguanidine salt of dicatechol borate, 1,3-di-o-cumenylguanidine, 1,3-di-o-biphenylguanidine, 1,3-di-o-cumenyl-2-propionylguanidine, and the like. Among these, 1,3-diphenylguanidine, 1,3-di-o-tolylguanidine, and 1-o-tolylbiguanide are preferable because these are highly reactive, and 1,3-diphenylguanidine is especially preferable because it is more highly reactive.

The sulfenamides used in the process for producing a rubber composition of the present invention include N-cyclohexyl-2-benzothiazolylsulfenamide, N,N-dicyclohexyl-2-benzothiazolylsulfenamide, N-tert-butyl-2-benzothiazolylsulfenamide, N-oxydiethylene-2-benzothiazolylsulfenamide, N-methyl-2-benzothiazolylsulfenamide, N-ethyl-2-benzothiazolylsulfenamide, N-propyl-2-benzothiazolylsulfenamide, N-butyl-2-benzothiazolylsulfenamide, N-pentyl-2-benzothiazolylsulfenamide, N-hexyl-2-benzothiazolylsulfenamide, N-pentyl-2-benzothiazolylsulfenamide, N-octyl-2-benzothiazolylsulfenamide, N-2-ethylhexyl-2-benzothiazolylsulfenamide, N-decyl-2-benzothiazolylsulfenamide, N-dodecyl-2-benzothiazolylsulfenamide, N-stearyl-2-benzothiazolylsulfenamide, N,N-dimethyl-2-benzothiazolylsulfenamide, N,N-diethyl-2-benzothiazolylsulfenamide, N,N-dipropyl-2-benzothiazolylsulfenamide, N,N-dibutyl-2-benzothiazolylsulfenamide, N,N-dipentyl-2-benzothiazolylsulfenamide, N,N-dihexyl-2-benzothiazolylsulfenamide, N,N-dipentyl-2-benzothiazolylsulfenamide, N,N-dioctyl-2-benzothiazolylsulfenamide, N,N-di-2-ethylhexylbenzothiazolylsulfenamide, N-decyl-2-benzothiazolylsulfenamide, N,N-didodecyl-2-benzothiazolylsulfenamide, N,N-distearyl-2-benzothiazolylsulfenamide, and the like. Among these, N-cyclohexyl-2-benzothiazolylsulfenamide and N-tert-butyl-2-benzothiazolylsulfenamide are preferable because they are highly reactive.

The thiazoles used in the process for producing a rubber composition of the present invention include 2-mercaptobenzothiazole, di-2-benzothiazolyl disulfide, 2-mercaptobenzothiazole zinc salt, 2-mercaptobenzothiazole cyclohexylamine salt, 2-(N,N-diethylthiocarbamoylthio)benzothiazole, 2-(4'-morpholinodithio)benzothiazole, 4-methyl-2-mercaptobenzothiazole, di-(4-methyl-2-benzothiazolyl)disulfide, 5-chloro-2-mercaptobenzothiazole, 2-mercaptobenzothiazole sodium salt, 2-mercapto-6-nitrobenzothiazole, 2-mercaptonaphtho[1,2-d]thiazole, 2-mercapto-5-methoxybenzothiazole, 6-amino-2-mercaptobenzothiazole, and the like. Among these, 2-mercaptobenzothiazole and di-2-benzothiazolyl disulfide are preferable because they are highly reactive.

The thiurams used in the process for producing a rubber composition of the present invention include tetramethylthiuram disulfide, tetraethylthiuram disulfide, tetrapropylthiuram disulfide, tetraisopropylthiuram disulfide, tetrabutylthiuram disulfide, tetrapentylthiuram disulfide, tetrahexylthiuram disulfide, tetraheptylthiuram disulfide, tetraoctylthiuram disulfide, tetranonylthiuram disulfide, tetradecylthiuram disulfide, tetradodecylthiuram disulfide, tetrastearylthiuram disulfide, tetrabenzylthiuram disulfide, tetrakis(2-ethylhexyl)thiuram disulfide, tetramethylthiuram monosulfide, tetraethylthiuram monosulfide, tetrapropylthiuram monosulfide, tetraisopropylthiuram monosulfide, tetrabutylthiuram monosulfide, tetrapentylthiuram monosulfide, tetrahexylthiuram monosulfide, tetraheptylthiuram monosulfide, tetraoctylthiuram monoisulfide, tetranonylthiuram monosulfide, tetradecylthiuram monosulfide, tetra dodecylthiuram monosulfide, tetrastearylthiuram monosulfide, tetrabenzylthiuram monosulfide, dipentamethylenethiuram tetrasulfide, and the like. Among these, tetrakis(2-ethylhexyl)thiuram disulfide and tetrabenzylthiuram disulfide are preferable because these are highly reactive.

The dithiocarbamates used in the process for producing a rubber composition of the present invention include zinc dimethyldithiocarbamate, zinc diethyldithiocarbamate, zinc dipropyldithiocarbamate, zinc diisopropyldithiocarbamate, zinc dibutyldithiocarbamate, zinc dipentyldithiocarbamate, zinc dihexyldithiocarbamate, zinc diheptyldithiocarbamate, zinc dioctyldithiocarbamate, zinc di(2-ethylhexyl)dithiocarbamate, zinc didecyldithiocarbamate, zinc didodecyldithiocarbamate, zinc N-pentamethylenedithiocarbamate, zinc N-ethyl-N-phenyldithiocarbamate, zinc dibenzyldithiocarbamate, copper dimethyldithiocarbamate, copper diethyldithiocarbamate, copper dipropyldithiocarbamate, copper diisopropyldithiocarbamate, copper dibutyldithiocarbamate, copper dipentyldithiocarbamate, copper dihexyldithiocarbamate, copper diheptyldithiocarbamate, copper dioctyldithiocarbamate, copper di(2-ethylhexyl)dithiocarbamate, copper didecyldithiocarbamate, copper didodecyldithiocarbamate, copper N-pentamethylenedithiocarbamate, copper dibenzyldithiocarbamate, sodium dimethyldithiocarbamate, sodium diethyldithiocarbamate, sodium dipropyldithiocarbamate, sodium diisopropyldithiocarbamate, sodium dibutyldithiocarbamate, sodium dipentyldithiocarbamate, sodium dihexyldithiocarbamate, sodium diheptyldithiocarbamate, sodium dioctyldithiocarbamate, sodium di(2-ethylhexyl)dithiocarbamate, sodium didecyldithiocarbamate, sodium didodecyldithiocarbamate, sodium N-pentamethylenedithiocarbamate, sodium dibenzyldithiocarbamate, ferric dimethyldithiocarbamate, ferric diethyldithiocarbamate, ferric dipropyldithiocarbamate, ferric diisopropyldithiocarbamate, ferric dibutyldithiocarbamate, ferric dipentyldithiocarbamate, ferric dihexyldithiocarbamate, ferric diheptyldithiocarbamate, ferric dioctyldithiocarbamate, ferric di(2-ethylhexyl)dithiocarbamate, ferric didecyldithiocarbamate, ferric didodecyldithiocarbamate, ferric N-pentamethylenedithiocarbamate, ferric dibenzyldithiocarbamate, and the like. Among these, zinc dibenzyldithiocarbamate, zinc N-ethyl-N-phenyldithiocarbamate, zinc dimethyldithiocarbamate, and copper dimethyldithiocarbamate are preferable because these are highly reactive.

The thioureas used in the process for producing a rubber composition of the present invention include thiourea, N,N'-diphenylthiourea, trimethylthiourea, N,N'-diethylthiourea, N,N'-dimethylthiourea, N,N'-dibutylthiourea, ethylenethiourea, N,N'-diisopropylthiourea, N,N'-dicyclohexylthiourea, 1,3-di(o-tolyl)thiourea, 1,3-di(p-tolyl)thiourea, 1,1-diphenyl-2-thiourea, 2,5-dithiobiurea, guanylthiourea, 1-(1-naphthyl)-2-thiourea, 1-phenyl-2-thiourea, p-tolylthiourea, o-tolylthiourea, and the like. Among these, thiourea, N,N'-diethylthiourea, trimethylthiourea, N,N'-diphenylthiourea, and N,N'-dimethylthiourea are preferable because these are highly reactive. The xanthates used in the process for producing a rubber composition of the present invention include zinc methyl xanthate, zinc ethyl xanthate, zinc propyl xanthate, zinc isopropyl xanthate, zinc butyl xanthate, zinc pentyl xanthate, zinc hexyl xanthate, zinc heptyl xanthate, zinc octyl xanthate, zinc 2-ethylhexyl xanthate, zinc decyl xanthate, zinc dodecyl xanthate, potassium methyl xanthate, potassium ethyl xanthate, potassium propyl xanthate, potassium isopropyl xanthate, potassium butyl xanthate, potassium pentyl xanthate, potassium hexyl xanthate, potassium heptyl xanthate, potassium octyl xanthate, potassium 2-ethylhexyl xanthate, potassium decyl xanthate, potassium dodecyl xanthate, sodium methyl xanthate, sodium ethyl xanthate, sodium propyl xanthate, sodium isopropyl xanthate, sodium butyl xanthate, sodium pentyl xanthate, sodium hexyl xanthate, sodium heptyl xanthate, sodium octyl xanthate, sodium 2-ethylhexyl xanthate, sodium decyl xanthate, sodium dodecyl xanthate, and the like. Among these, zinc isopropyl xanthate is preferable because it is highly reactive.

In the first step of kneading according to the present invention, it is preferred that the ratio of the number of the molecules (molar number) of the vulcanization accelerator (D) to that of the silane coupling agent (C) is 0.1 to 10. Namely, in the case where it is not less than 0.1, activation is sufficiently caused by the silane coupling agent (C), and in the case where it is not more than 10, vulcanization rate is not largely affected. More preferably, the ratio of the number of the molecules (molar number) of the vulcanization accelerator (D) to that of the silane coupling agent (C) is 0.3 to 7.0.

Furthermore, as the vulcanization accelerator can be used as an accelerator for sulfur vulcanization, it can be compounded at the final step of kneading in a proper amount, if desired.

[Organic Acid Compound]

Examples of the organic acid compound which can be used in the present invention include an organic acid selected from a saturated fatty acid or an unsaturated fatty acid, such as stearic acid, palmitic acid, myristic acid, lauric acid, arachidic acid, behenic acid, lignoceric acid, capric acid, pelargonic acid, caprylic acid, enanthic acid, caproic acid, oleic acid, vaccenic acid, linoleic acid, linolenic acid, and nervonic acid, and a resin acid, such as rosin acid and modified rosin acid, and metal salts or esters (especially, partial ester) of the saturated fatty acids, the unsaturated fatty acids, and the resin acids.

In the present invention, 50 mol % or more of the organic acid compound is preferably stearic acid because the compound has to sufficiently exhibit its function as a vulcanization accelerating aid.

Further, when an emulsion-polymerized styrene-butadiene copolymer is used as a portion or all of the rubber component (A), it is preferable, from the viewpoint of an emulsifier necessary to obtain the emulsion-polymerized styrene-butadiene copolymer, that 50 mol % or more of the organic acid compound is accounted for by the rosin acids (including the modified rosin acids) and/or fatty acids which are contained in the emulsion-polymerized styrene-butadiene copolymer.

[Rubber Component (A)]

As the synthetic dienic rubber of the rubber component (A) for use in the rubber composition production process of the present invention, usable here are styrene-butadiene copolymer rubber (SBR), polybutadiene rubber (BR), polyisoprene rubber (IR), butyl rubber (IIR), ethylene-propylene-diene tercopolymer rubber (EPDM), etc. One or more different types of natural rubbers and synthetic dienic rubbers may be used here either singly or as combined.

As the inorganic filler (B) for use in the rubber composition production process of the present invention, usable are silica and an inorganic compound represented by the following general formula (VIII):

  (VIII)

In the general formula (VIII), $M^1$ represents at least one selected from, a metal selected from aluminium, magnesium, titanium, calcium and zirconium, and oxides or hydroxides of those metals, their hydrates, or carbonates of the metals; d, x, y and z each indicate an integer of from 1 to 5, an integer of from 0 to 10, an integer of from 2 to 5, and an integer of from 0 to 10, respectively.

In the general formula (VIII), when x and z are both 0, then the inorganic compound is at least one metal selected from aluminium, magnesium, titanium, calcium and zirconium, or a metal oxide or metal hydroxide thereof.

In the present invention, silica is preferred as the inorganic filler (B) from the viewpoint of satisfying both low rolling property and abrasion resistance.

As silica, any commercially-available one is usable here; and above all, preferred is precipitated silica, fumed silica or colloidal silica, and more preferred is precipitated silica. Preferably, the BET specific surface area (as measured according to ISO 5794/1) of silica for use herein is from 40 to 350 m$^2$/g. Silica of which the BET specific surface area falls within the range is advantageous in that it satisfies both rubber-reinforcing capability and dispersibility in rubber component. From this viewpoint, silica having a BET specific surface area in a range of 80 to 350 m$^2$/g is more preferable, especially preferable being silica having a BET specific surface area in a range of 120 to 350 m$^2$/g. As such silica, there may be used commercial products such as trade name "Nipsil AQ" (BET specific surface area=220 m$^2$/g) and trade name "Nipsil KQ" produced by Tosoh Silica Corporation, and "Ultrasil VN3" (BET specific surface area=175 m$^2$/g) produced by Degussa AG, and the like.

As the inorganic compound represented by the general formula (III), usable here are alumina ($Al_2O_3$) such as γ-alumina, α-alumina, etc.; alumina monohydrate ($Al_2O_3.H_2O$) such as boehmite, diaspore, etc.; aluminium hydroxide [Al(OH)$_3$] such as gypsite, bayerite, etc.; aluminium carbonate [$Al_2(CO_3)_2$], magnesium hydroxide [Mg(OH)$_2$], magnesium oxide (MgO), magnesium carbonate (MgCO$_3$), talc (3MgO.4SiO$_2$.H$_2$O), attapulgite (5MgO.8SiO$_2$.9H$_2$O), titanium white (TiO$_2$), titanium black (TiO$_{2n-1}$), calcium oxide (CaO), calcium hydroxide [Ca(OH)$_2$], aluminium magnesium oxide (MgO.Al$_2$O$_3$), clay (Al$_2$O$_3$.2SiO$_2$), kaolin (Al$_2$O$_3$.2SiO$_2$.2H$_2$O), pyrophyllite (Al$_2$O$_3$.4SiO$_2$.H$_2$O), bentonite (Al$_2$O$_3$.4SiO$_2$.2H$_2$O), aluminium silicate (Al$_2$SiO$_5$, Al$_4$.3SiO$_4$.5H$_2$O, etc.), magnesium silicate (Mg$_2$SiO$_4$, MgSiO$_3$, etc.), calcium silicate (Ca$_2$.SiO$_4$, etc.), aluminium calcium silicate (Al$_2$O$_3$.CaO.2SiO$_2$, etc.), magnesium calcium silicate (CaMgSiO$_4$), calcium carbonate (CaCO$_3$), zirconium oxide (ZrO$_2$), zirconium hydroxide [ZrO(OH)$_2$.nH$_2$O], zirconium carbonate [Zr(CO$_3$)$_2$]; as well as crystalline aluminosilicate salts containing a charge-correcting hydrogen, alkali metal or alkaline earth metal such as various types of zeolite. Also, it is preferable when $M^1$ in the general formula (VIII) is at least one selected from an aluminum metal, an oxide or a hydroxide of aluminum or a hydrate thereof, or a carbonate of aluminum. Among these, aluminum hydroxide is especially preferable.

One or more different types of the inorganic compounds of the general formula (VIII) may be used here either singly or as combined. The mean particle size of the inorganic compound is preferably within a range of from 0.01 to 10 μm from the viewpoint of the balance of kneading workability, abrasion resistance and wet grip performance, and more preferably within a range of from 0.05 to 5 μm.

As the inorganic filler (B) in the present invention, silica alone may be used, or silica as combined with at least one inorganic compound of the general formula (VIII) may be used.

If desired, the filler in the rubber composition in the present invention may contain carbon black in addition to the above-mentioned inorganic filler (B). Containing carbon black, the filler enjoys the effect of lowering the electric resistance of the rubber composition to thereby prevent static electrification thereof. Carbon black for use herein is not specifically defined. For example, preferred is use of high, middle or low-structure SAF, ISAF, IISAF, N339, HAF, FEF, GPF, SRF-grade carbon black; and more preferred is use of SAF, ISAF, IISAF, N339, HAF, FEF-grade carbon black. Preferably, the nitrogen adsorption specific surface area (N$_2$SA, as measured according to JIS K 6217-2:2001) of such carbon black is from 30 to 250 m2/g. One alone or two or more different types of such carbon black may be used here either singly or as combined. In the present invention, the inorganic filler (B) does not contain carbon black.

The inorganic filler (B) in the rubber composition in the present invention is preferably in an amount of from 20 to 120 parts by mass relative to 100 parts by mass of the rubber component (A). When the amount is at least 20 parts by mass, then it is favorable from the viewpoint of securing wet performance; and when at most 120 parts by mass, then it is favorable from the viewpoint of reducing rolling resistance. Further, the amount is more preferably from 30 to 100 parts by mass.

Also preferably, the filler in the rubber composition in the present invention is in an amount of from 20 to 150 parts by mass relative to 100 parts by mass of the rubber component (A). When the amount is at least 20 parts by mass, then it is favorable from the viewpoint of enhancing rubber composition reinforcing capability; and when at most 150 parts by mass, then it is favorable from the viewpoint of reducing rolling resistance.

Of the filler, the inorganic filler (B) accounts for, from the viewpoint of a balance between the wet performance and the rolling resistance, preferably 40 mass % or more and more preferably 70 mass % or more.

In the rubber composition production process of the present invention, various additives that are generally incorporated in a rubber composition, for example, a vulcanization activator such as zinc flower or the like, an antioxidant and others may be optionally added and kneaded in the first stage or the final stage of kneading, or in the intermediate stage between the first stage and the final stage.

In the first aspect of the present invention, preferably, an organic acid compound (E) is added in the last stage of kneading. This is for the purpose of favorably preventing the coupling function activity of the silane coupling agent from being reduced by the organic acid compound (E).

In the first aspect of the present invention, preferably, the number of molecules X of the organic acid compound (E) in the rubber composition in the first stage of kneading satisfies the relationship represented by the following formula [1] relative to the number of molecules Y of the vulcanization promoter (D) therein.

$$0 \le X \le 3.0 \times Y \quad [1]$$

The number of molecules (molar number) X of the organic acid compound (E) in the rubber composition in the first stage of kneading is to be at least 3.0 times the number of molecules (molar number) Y of the vulcanization promoter (D) therein is for the purpose of favorably preventing the coupling function activity improving effect from being reduced by the incorporation of the vulcanization accelerator (D).

EXAMPLES

The present invention is described in more detail with reference to the following Examples; however, the present invention is not limited at all by the following Examples.

The low-heat-generating property (tan δ index) was evaluated according to the following method.

[Low-Heat-Generation Property (Tan δ Index)]

Using a viscoelasticity measuring device (by Rheometric), the tan δ of a vulcanized rubber sample that had been prepared by vulcanizing a rubber composition at 160° C. for 15 minutes was measured at a temperature of 60° C., at a dynamic strain of 5% and at a frequency of 15 Hz. Taking the reciprocal of the tan δ in Comparative Example 1 or 19 as 100, the data were expressed as index indication according to the following formula. The samples having a larger index value have a better low-heat-generation property and have a smaller hysteresis loss.

Low heat generation index={(tan δ of vulcanized rubber composition of Comparative Example 1)/(tan δ of vulcanized rubber composition tested)}×100

[Abrasion Resistance]

Using a Lambourn abrasion tester according to JIS K6264-2:2005, a vulcanized rubber sample that had been prepared by vulcanizing a rubber composition at 160° C. for 15 minutes was tested. Taking the abrasion resistance of the vulcanized rubber in Comparative Example 1 as 100, the data were expressed as index indication according to the following formula. The samples having a larger index value have more excellent abrasion resistance.

Abrasion resistance index={(depth of wear in Comparative Example 1)/(depth of wear of test sample)}×100

From the obtained abrasion resistance index data, the samples were evaluated for the abrasion resistance thereof according to the following criteria.
A: Abrasion resistance index of 105 or more.
B: Abrasion resistance index of from 100 to less than 105.
C: Abrasion resistance index of from 90 to less than 100.
D: Abrasion resistance index of less than 90.

Examples 1 to 22 and Comparative Examples 1 to 3

According to the compounding recipes and the kneading methods shown in Table 1, 24 types of rubber compositions were prepared by kneading in a Banbury mixer. In the first stage of kneading of all the rubber compositions, the rubber component (A), all or a portion of the inorganic filler (B) and the silane coupling agent (C) were kneaded, and then after 60 seconds, but after 10 seconds in Comparative Example 2 and in Examples 1 and 2, the vulcanization accelerator (D) was added thereto and further kneaded. Thus obtained, those 24 types of rubber composition were evaluated for the low-heat-generation property (tan δ index) and the abrasion resistance thereof according to the above-mentioned methods. The results are shown in Table 1.

TABLE 1

| | | (mass parts) | Example 1 | 2 | 3 | 4 | 5 | 6 | 7 | 8 | 9 |
|---|---|---|---|---|---|---|---|---|---|---|---|
| Compounding ingredients | First stage of kneading | Solution-polymerized SBR-1 *1 | 100 | 100 | 100 | 100 | 100 | 100 | 100 | 100 | 100 |
| | | Carbon black-1 N220 *2 | 10 | 10 | 10 | 10 | 10 | 10 | 10 | 10 | 10 |
| | | Silica *3 | 50 | 50 | 50 | 50 | 50 | 50 | 50 | 50 | 50 |
| | | Silane coupling agent Si69 *4 | 4 | 4 | 4 | 4 | 4 | 4 | 4 | 4 | 4 |
| | | Aromatic oil | 30 | 30 | 30 | 30 | 30 | 30 | 30 | 30 | 30 |
| | | Stearic acid | — | — | — | — | — | — | — | 2 | 2 |
| | | Antioxidant 6PPD *5 | — | — | — | — | — | — | — | — | 1 |
| | | 1,3-Diphenylquanidine *6 | 1 | 1 | 1 | 1 | 1 | 1 | 1 | 1 | 1 |
| | | N-cyclohexyl-2-benzothiazolyl-sulfenamide *7 | — | — | — | — | — | — | — | — | — |
| | | 2-Mercaptobenzothiazole *8 | — | — | — | — | — | — | — | — | — |
| | | Tetrakis(2-ethylhexyl)thiuram disulfide *9 | — | — | — | — | — | — | — | — | — |
| | | Tetrakis(benzyl)thiuram disulfide *10 | — | — | — | — | — | — | — | — | — |
| | | N,N'-diethylthiourea *11 | — | — | — | — | — | — | — | — | — |
| | | Trimethylthiourea *12 | — | — | — | — | — | — | — | — | — |
| | | N,N'-diphenylthiourea *13 | — | — | — | — | — | — | — | — | — |
| | | Thiourea | — | — | — | — | — | — | — | — | — |
| | | Zinc dibenzyldithiocarbamate *14 | — | — | — | — | — | — | — | — | — |
| | | Zinc N-ethyl-N-phenyldithiocarbamate *15 | — | — | — | — | — | — | — | — | — |
| | | Zinc dimethyldithiocarbamate *16 | — | — | — | — | — | — | — | — | — |
| | | Copper dimethyldithiocarbamate *17 | — | — | — | — | — | — | — | — | — |
| | | Zinc isopropylxanthate *18 | — | — | — | — | — | — | — | — | — |
| | Last stage of kneading | Stearic acid | 2 | 2 | 2 | 2 | 2 | 2 | 2 | — | — |
| | | Antioxidant 6PPD *5 | 1 | 1 | 1 | 1 | 1 | 1 | 1 | 1 | — |
| | | Antioxidant TMDQ *19 | — | — | — | — | — | — | — | — | — |
| | | Zinc flower | 2.5 | 2.5 | 2.5 | 2.5 | 2.5 | 2.5 | 2.5 | 2.5 | 2.5 |
| | | 1,3-Diphenylguanidine *6 | 0.6 | 0.6 | 0.6 | 0.6 | 0.6 | 0.6 | 0.6 | 0.6 | 0.6 |
| | | Vulcanization accelerator MBTS *20 | 1 | 1 | 1 | 1 | 1 | 1 | 1 | 1 | 1 |
| | | Vulcanization accelerator TBBS *21 | 0.6 | 0.6 | 0.6 | 0.6 | 0.6 | 0.6 | 0.6 | 0.6 | 0.6 |
| | | Sulfur | 1.5 | 1.5 | 1.5 | 1.5 | 1.5 | 1.5 | 1.5 | 1.5 | 1.5 |

TABLE 1-continued

| | | | | | | | | | |
|---|---|---|---|---|---|---|---|---|---|
| Processing conditions | | Specific energy in first stage kneading (kWh/kg) | 0.05 | 0.07 | 0.23 | 0.27 | 0.37 | 1.00 | 1.50 | 0.27 | 0.27 |
| | | Blade rotation speed in kneading device in first stage kneading (unit: rpm) | 65 | 65 | 40 | 65 | 80 | 65 | 65 | 65 | 65 |
| | | Kneading time in first stage kneading (unit: min); however, unit of parenthesized data: sec | 1 | (80 sec) | 4 | 4 | 4 | 20 | 30 | 4 | 4 |
| Properties of vulcanized material | | Low heat generation property (tanδ index) | 102 | 104 | 113 | 117 | 135 | 111 | 248 | 108 | 109 |
| | | Abrasion resistance | B | A | A | A | A | A | B | B | B |

| | | | Example | | | | | | | |
|---|---|---|---|---|---|---|---|---|---|---|
| | | (mass parts) | 10 | 11 | 12 | 13 | 14 | 15 | 16 | 17 |
| Compounding ingredients | First stage of kneading | Solution-polymerized SBR-1 *1 | 100 | 100 | 100 | 100 | 100 | 100 | 100 | 100 |
| | | Carbon black-1 N220 *2 | 10 | 10 | 10 | 10 | 10 | 10 | 10 | 10 |
| | | Silica *3 | 50 | 50 | 50 | 50 | 50 | 50 | 50 | 50 |
| | | Silane coupling agent Si69 *4 | 4 | 4 | 4 | 4 | 4 | 4 | 4 | 4 |
| | | Aromatic oil | 30 | 30 | 30 | 30 | 30 | 30 | 30 | 30 |
| | | Stearic acid | — | — | — | — | — | — | — | — |
| | | Antioxidant 6PPD *5 | — | — | — | — | — | — | — | — |
| | | 1,3-Diphenylquanidine *6 | — | — | — | — | — | — | — | — |
| | | N-cyclohexyl-2-benzothiazolyl-sulfenamide *7 | 1 | — | — | — | — | — | — | — |
| | | 2-Mercaptobenzothiazole *8 | — | 1 | — | — | — | — | — | — |
| | | Tetrakis(2-ethylhexyl)thiuram disulfide *9 | — | — | 1 | — | — | — | — | — |
| | | Tetrakis(benzyl)thiuram disulfide *10 | — | — | — | 1 | — | — | — | — |
| | | N,N'-diethylthiourea *11 | — | — | — | — | 1 | — | — | — |
| | | Trimethylthiourea *12 | — | — | — | — | — | 1 | — | — |
| | | N,N'-diphenylthiourea *13 | — | — | — | — | — | — | 1 | — |
| | | Thiourea | — | — | — | — | — | — | — | — |
| | | Zinc dibenzyldithiocarbamate *14 | — | — | — | — | — | — | — | 1 |
| | | Zinc N-ethyl-N-phenyldithiocarbamate *15 | — | — | — | — | — | — | — | — |
| | | Zinc dimethyldithiocarbamate *16 | — | — | — | — | — | — | — | — |
| | | Copper dimethyldithiocarbamate *17 | — | — | — | — | — | — | — | — |
| | | Zinc isopropylxanthate *18 | — | — | — | — | — | — | — | — |
| | Last stage of kneading | Stearic acid | 2 | 2 | 2 | 2 | 2 | 2 | 2 | 2 |
| | | Antioxidant 6PPD *5 | 1 | 1 | 1 | 1 | 1 | 1 | 1 | 1 |
| | | Antioxidant TMDQ *19 | — | — | — | — | — | — | — | — |
| | | Zinc flower | 2.5 | 2.5 | 2.5 | 2.5 | 2.5 | 2.5 | 2.5 | 2.5 |
| | | 1,3-Diphenylguanidine *6 | 0.6 | 0.6 | 0.6 | 0.6 | 0.6 | 0.6 | 0.6 | 0.6 |
| | | Vulcanization accelerator MBTS *20 | 1 | 1 | 1 | 1 | 1 | 1 | 1 | 1 |
| | | Vulcanization accelerator TBBS *21 | 0.6 | 0.6 | 0.6 | 0.6 | 0.6 | 0.6 | 0.6 | 0.6 |
| | | Sulfur | 1.5 | 1.5 | 1.5 | 1.5 | 1.5 | 1.5 | 1.5 | 1.5 |
| Processing conditions | | Specific energy in first stage kneading (kWh/kg) | 0.27 | 0.27 | 0.27 | 0.27 | 0.27 | 0.27 | 0.27 | 0.27 |
| | | Blade rotation speed in kneading device in first stage kneading (unit: rpm) | 65 | 65 | 65 | 65 | 65 | 65 | 65 | 65 |
| | | Kneading time in first stage kneading (unit: min); however, unit of parenthesized data: sec | 4 | 4 | 4 | 4 | 4 | 4 | 4 | 4 |
| Properties of vulcanized material | | Low heat generation property (tanδ index) | 120 | 120 | 126 | 128 | 121 | 124 | 120 | 129 |
| | | Abrasion resistance | B | B | B | B | B | B | B | B |

| | | | Example | | | | | Comparative Example | | |
|---|---|---|---|---|---|---|---|---|---|---|
| | | (mass parts) | 18 | 19 | 20 | 21 | 22 | 1 | 2 | 3 |
| | Compounding ingredients | First stage of kneading | Solution-polymerized SBR-1 *1 | 100 | 100 | 100 | 100 | 100 | 100 | 100 | 100 |
| | | Carbon black-1 N220 *2 | 10 | 10 | 10 | 10 | 10 | 10 | 10 | 10 |
| | | Silica *3 | 50 | 50 | 50 | 50 | 50 | 50 | 50 | 50 |
| | | Silane coupling agent Si69 *4 | 4 | 4 | 4 | 4 | 4 | 4 | 4 | 4 |
| | | Aromatic oil | 30 | 30 | 30 | 30 | 30 | 30 | 30 | 30 |
| | | Stearic acid | — | — | — | — | — | 2 | — | — |
| | | Antioxidant 6PPD *5 | — | — | — | — | — | 1 | — | — |
| | | 1,3-Diphenylquanidine *6 | — | — | — | — | — | — | 1 | 1 |
| | | N-cyclohexyl-2-benzothiazolyl-sulfenamide *7 | — | — | — | — | — | — | — | — |
| | | 2-Mercaptobenzothiazole *8 | — | — | — | — | — | — | — | — |
| | | Tetrakis(2-ethylhexyl)thiuram disulfide *9 | — | — | — | — | — | — | — | — |
| | | Tetrakis(benzyl)thiuram disulfide *10 | — | — | — | — | — | — | — | — |
| | | N,N'-diethylthiourea *11 | — | — | — | — | — | — | — | — |
| | | Trimethylthiourea *12 | — | — | — | — | — | — | — | — |

TABLE 1-continued

|  |  |  |  |  |  |  |  |  |  |
|---|---|---|---|---|---|---|---|---|---|
|  |  | N,N'-diphenylthiourea *13 | — | — | — | — | — | — | — | — |
|  |  | Thiourea | — | — | — | — | 1 | — | — | — |
|  |  | Zinc dibenzyldithiocarbamate *14 | — | — | — | — | — | — | — | — |
|  |  | Zinc N-ethyl-N-phenyldithiocarbamate *15 | 1 | — | — | — | — | — | — | — |
|  |  | Zinc dimethyldithiocarbamate *16 | — | 1 | — | — | — | — | — | — |
|  |  | Copper dimethyldithiocarbamate *17 | — | — | 1 | — | — | — | — | — |
|  |  | Zinc isopropylxanthate *18 | — | — | — | 1 | 1 | — | — | — |
|  | Last stage of kneading | Stearic acid | 2 | 2 | 2 | 2 | 2 | — | 2 | 2 |
|  |  | Antioxidant 6PPD *5 | 1 | 1 | 1 | 1 | 1 | — | 1 | 1 |
|  |  | Antioxidant TMDQ *19 | — | — | — | — | — | 1 | — | — |
|  |  | Zinc flower | 2.5 | 2.5 | 2.5 | 2.5 | 2.5 | 2.5 | 2.5 | 2.5 |
|  |  | 1,3-Diphenylguanidine *6 | 0.6 | 0.6 | 0.6 | 0.6 | 0.6 | 1.6 | 0.6 | 0.6 |
|  |  | Vulcanization accelerator MBTS *20 | 1 | 1 | 1 | 1 | 1 | 1 | 1 | 1 |
|  |  | Vulcanization accelerator TBBS *21 | 0.6 | 0.6 | 0.6 | 0.6 | 0.6 | 0.6 | 0.6 | 0.6 |
|  |  | Sulfur | 1.5 | 1.5 | 1.5 | 1.5 | 1.5 | 1.5 | 1.5 | 1.5 |
| Processing conditions |  | Specific energy in first stage kneading (kWh/kg) | 0.27 | 0.27 | 0.27 | 0.27 | 0.27 | 0.19 | 0.03 | 1.98 |
|  |  | Blade rotation speed in kneading device in first stage kneading (unit: rpm) | 65 | 65 | 65 | 65 | 65 | 65 | 20 | 110 |
|  |  | Kneading time in first stage kneading (unit: min); however, unit of parenthesized data: sec | 4 | 4 | 4 | 4 | 4 | 3 | (25 sec) | 40 |
| Properties of vulcanized material |  | Low heat generation property (tanδ index) | 129 | 127 | 122 | 124 | 125 | 100 | 93 | 222 |
|  |  | Abrasion resistance | B | B | B | B | A | B | D | D |

[Notes]
*1: Asahi Chemicals' non-modified solution-polymerized SBR, trade name "Toughden 2000"
*2: Asahi Carbon's trade name "#80"
*3: Tosoh Silica's "Nipsil AQ", BET specific surface area 220 $m^2/g$
*4: Bis(3-triethoxysilylpropyl) disulfide, Evonik's silane coupling agent, trade name "Si69" (registered trademark)
*5: N-(1,3-dimethylbutyl)-N'-phenyl-p-phenylenediamine, by Ouchi Shinko Chemical, trade name "Nocrac 6C"
*6: 1,3-Diphenylguanidine, Sanshin Chemical's trade name "Sanceler D"
*7: Ouchi Shinko Chemical's trade name "Nocceler CZ"
*8: Ouchi Shinko Chemical's trade name "Nocceler M"
*9: Ouchi Shinko Chemical's trade name "Nocceler TOT"
*10: Sanshin Chemical's trade name "Sanceler TBZTD"
*11: Ouchi Shinko Chemical's trade name "Nocceler EUR"
*12: Ouchi Shinko Chemical's trade name "Nocceler TMU"
*13: Ouchi Shinko Chemical's trade name "Nocceler C"
*14: Sanshin Chemical's trade name "Sanceler Z-BE"
*15: Sanshin Chemical's trade name "Sanceler PX"
*16: Sanshin Chemical's trade name "Sanceler PZ"
*17: Sanshin Chemical's trade name "Sanceler TT-CU"
*18: Ouchi Shinko Chemical's trade name "Nocceler ZIX-O"
*19: 2,2,4-Trimethyl-1,2-dihydroquinoline polymer, Ouchi Shinko Chemical's trade name "Nocrac 224"
*20: Di-2-benzothiazolyl disulfide, Sanshin Chemical's trade name "Sanceler DM"
*21: N-tert-butyl-2-benzothiazolylsulfenamide, Sanshin Chemical's trade name "Sanceler NS"

As obvious from Table 1, the rubber compositions of Examples 1 to 22 all had a good low-heat-generation property (tan δ index) and good abrasion resistance, as compared with the comparative rubber compositions of Comparative Examples 1 to 3.

INDUSTRIAL APPLICABILITY

According to the production process for a rubber composition of the present invention, it is possible to obtain a rubber composition excellent in low-heat-generation property with successfully inhibiting the coupling function activity of the silane coupling agent used from lowering and with further increasing the coupling activity thereof, and is therefore favorably used as a production method for constitutive members of various types of pneumatic tires for passenger cars, small-size trucks, minivans, pickup trucks and big-size vehicles (trucks, buses, construction vehicles, etc.) and others, especially for tread members of pneumatic radial tires.

The invention claimed is:

1. A process for producing a rubber composition containing at least one rubber component (A) selected from natural rubbers and synthetic diene rubbers, a filler containing an inorganic filler (B), a silane coupling agent (C) and a vulcanization accelerator (D), wherein:
   the rubber composition is kneaded in multiple stages, the rubber component (A), all or a portion of the inorganic filler (B), all or a portion of the silane coupling agent (C) and the vulcanization accelerator (D) are added and kneaded in the first stage of kneading, and the specific energy for kneading in the first stage is from 0.05 to 1.50 kWh/kg, and wherein the specific energy is obtained by dividing the power consumption by the motor in the kneading device in the first stage of kneading by the total mass of the rubber composition therein, and
   the blade rotation speed of the kneading device in the first stage is from 25 to 100 rpm.

2. The process for producing a rubber composition according to claim 1, wherein the kneading time in the first stage is from 30 seconds to 30 minutes.

3. The process for producing a rubber composition according to claim 1, wherein the vulcanization accelerator (D) is at least one selected from guanidines, sulfenamides, thiazoles, thiurams, dithiocarbamates, thioureas and xanthates.

4. The process for producing a rubber composition according to claim 3, wherein the guanidines are at least one compound selected from 1,3-diphenylguanidine, 1,3-di-o-tolylguanidine and 1-o-tolylbiguanide.

5. The process for producing a rubber composition according to claim 3, wherein the sulfenamides are any one or both of N-cyclohexyl-2-benzothiazolylsulfenamide and N-tert-butyl-2-benzothiazolylsulfenamide.

6. The process for producing a rubber composition according to claim 3, wherein the thiazoles are any one or both of 2-mercaptobenzothiazole and di-2-benzothiazolyl disulfide.

7. The process for producing a rubber composition according to claim 3, wherein the thiurams are any one or both of tetrakis(2-ethylhexyl)thiuram disulfide and tetrabenzylthiuram disulfide.

8. The process for producing a rubber composition according to claim 3, wherein the thioureas are at least one compound selected from thiourea, N,N'-diethylthiourea, trimethylthiourea, N,N'-diphenylthiourea and N,N'-dimethylthiourea.

9. The process for producing a rubber composition according to claim 3, wherein the dithiocarbamates are at least one compound selected from zinc dibenzyldithiocarbamate, zinc N-ethyl-N-phenyldithiocarbamate, zinc dimethyldithiocarbamate, and copper dimethyldithiocarbamate.

10. The process for producing a rubber composition according to claim 3, wherein the xanthate is zinc isopropylxanthate.

11. The process for producing a rubber composition according to claim 1, wherein the silane coupling agent (C) is at least one compound selected from the group consisting of the compounds represented by the following general formulae (I) to (IV);

[Chem. 1]

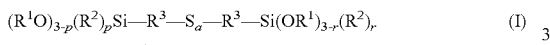
(I)

in the formula, $R^1$'s may be the same or different and are each a hydrogen atom, a linear, cyclic or branched alkyl group having 1 to 8 carbon atoms, or a linear or branched alkoxyalkyl group having 2 to 8 carbon atoms; $R^2$'s may be the same or different and are each a linear, cyclic, or branched alkyl group having 1 to 8 carbon atoms; $R^3$'s may be the same or different and are each a linear or branched alkylene group having 1 to 8 carbon atoms; a is 2 to 6 as an average value; and p and r may be the same or different and are each 0 to 3 as an average value, provided that p and r are not 3 at the same time;

[Chem. 2]

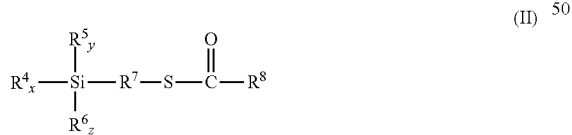
(II)

in the formula, $R^4$ is a monovalent group selected from —Cl, —Br, $R^9O$—, $R_9(C=O)O$—, $R^9R^{10}C=NO$—, $R^9R^{10}CNO$—, $R^9R^{10}N$— and —$(OSiR^9R^{10})_h$ $(OSiR^9R^{10}R^{11})(R^9, R^{10},$ and $R^{11}$ may be the same or different and are each a hydrogen atom or a monovalent hydrocarbon group having 1 to 19 carbon atoms, h is 1 to 4 average value); $R^5$ represents $R^4$, a hydrogen atom, or a monovalent hydrocarbon group having 1 to 18 carbon atoms; $R^6$ represents $R^4$, $R^5$, a hydrogen atom, or an —$[O(R^{12}O)j]_{0.5}$— group ($R^{12}$ is an alkylene group having 1 to 18 carbon atoms and j is an integer of 1 to 4); $R^7$ represents a divalent hydrocarbon group having 1 to 18 carbon atoms; $R^8$ represents a monovalent hydrocarbon group having 1 to 18 carbon atoms; and x, y, and z are numbers which satisfy the relationships: x+y+2z=3, $0 \le x \le 3$, $0 \le y \le 2$, and $0 \le z \le 1$;

[Chem. 3]

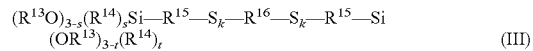
(III)

in the formula, $R^{13}$'s may be the same or different and are each a hydrogen atom, a linear, cyclic or branched alkyl group having 1 to 8 carbon atoms, or a linear or branched alkoxyalkyl group having 2 to 8 carbon atoms; $R^{14}$'s may m be the same or different and are each a linear, cyclic, or branched alkyl group having 1 to 8 carbon atoms; $R^{15}$'s may be the same or different and are each a linear or branched alkylene group having 1 to 8 carbon atoms; $R^{16}$ is a divalent group of any of general formulae, ($—S—R^{17}—S—$), and ($—R^{20}—S_{m2}—R^{21}—S_{m3}—R^{22}—$)($R^{17}$ to $R^{22}$ are each a divalent hydrocarbon group, a divalent aromatic group, or a divalent organic group containing a heteroatom other than sulfur or oxygen, each having 1 to 20 carbon atoms; and m1, m2, and m3 are each 1 or more but less than 4 as an average value); k's may be the same or different and are each 1 to 6 as an average value; s and t are each 0 to 3 as an average value, provided that s and t are not 3 at the same time;

[Chem. 4]

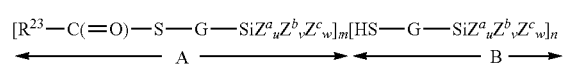
(IV)

in the formula, $R^{23}$ is a linear, branched or cyclic alkyl group having 1 to 20 carbon atoms; G's may be the same or different and are each an alkanediyl group or an alkenediyl group, having 1 to 9 carbon atoms; $Z^a$'s may be the same or different and are each a group which can bond to two silicon atoms and is selected from [—O-]$_{0.5}$, or [—O-G-O-]$_{0.5}$; $Z^b$'s may be the same or different and are each a group which can bond to two silicon atoms and is a functional group represented by —Cl, —Br, —$OR^e$, $R^eC(=O)O$—, $R^eR^fC=NO$—, $R^eR^fN$—, $R^e$—, HO-G-O— (G is the same as the above description); $R^e$ and $R^f$ are each a linear, branched, or cyclic alkyl group having 1 to 20 carbon atoms; and m, n, u, v, and w are $1 \le m \le 20$, $0 \le n \le 20$, $0 \le u \le 3$, $0 \le v \le 2$, $0 \le w \le 1$, and (u/2)+v+2w=2 or 3; when the formula has multiple A portions, $Z^a_u$'s, $Z^b_v$'s and $Z^c_w$'s in the multiple A portions may each be the same or different; and when the formula has multiple B portions, $Z^a_u$'s, $Z^b_v$'s and $Z^c_w$'s in the multiple B portions may each be the same or different.

12. The process for producing a rubber composition according to claim 11, wherein the silane coupling agent (C) is a compound represented by the general formula (I).

13. The process for producing a rubber composition according to claim 1, wherein the inorganic filler (B) is silica.

14. The process for producing a rubber composition according to claim 1, wherein the filler contains carbon black.

15. The process for producing a rubber composition according to claim 1, wherein the inorganic filler (B) accounts for at least 40% by mass of the filler.

16. The process for producing a rubber composition according to claim 1, wherein an organic acid compound (E) is added in the last stage of kneading.

17. The process for producing a rubber composition according to claim 16, wherein the number of molecules X of the organic acid compound (E) in the rubber composition satisfies the relationship of the following formula [1] relative to the number of molecules Y of the vulcanization promoter (D) therein, $$0 \leq X \leq 3.0 \times Y \qquad [1]$$

18. The process for producing a rubber composition according to claim 1, wherein in the first stage, after the rubber component (A), all or a portion of the inorganic filler (B) and all or a portion of the silane coupling agent (D) are kneaded, the vulcanization accelerator (D) is added thereto on the way of the first stage and is further kneaded.

19. A process for producing a rubber composition containing at least one rubber component (A) selected from natural rubbers and synthetic diene rubbers, a filler containing an inorganic filler (B), a silane coupling agent (C) and at least one vulcanization accelerator (D) selected from guanidines, sulfenamides, thiazoles, thiurams, dithiocarbamates, thioureas and xanthates, wherein the rubber composition is kneaded in three or more multiple stages, the rubber component (A), all or a portion of the inorganic filler (B), and all or a portion of the silane coupling agent (C) are kneaded in the first stage of kneading with a specific energy for kneading falling within a range of from 0.05 to 1.50 kWh/kg, the vulcanization accelerator (D) is added and kneaded in the stage after the second stage of kneading but before the last stage thereof, and a vulcanizing agent is added and kneaded in the last stage of kneading, and wherein the blade rotation speed of a kneading device in the first stage is from 25 to 100 rpm.

* * * * *